United States Patent Office 3,182,783
Patented May 11, 1965

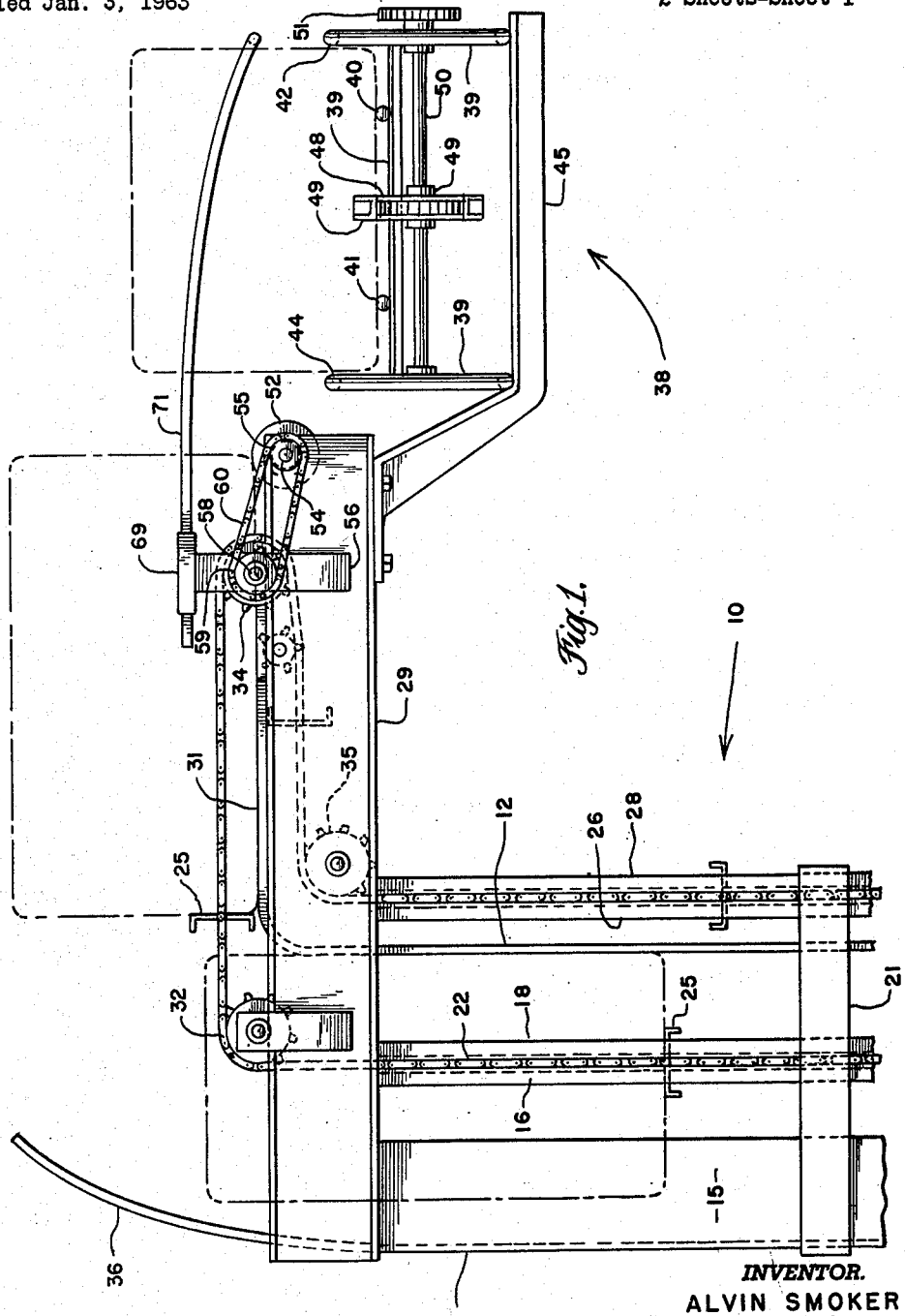

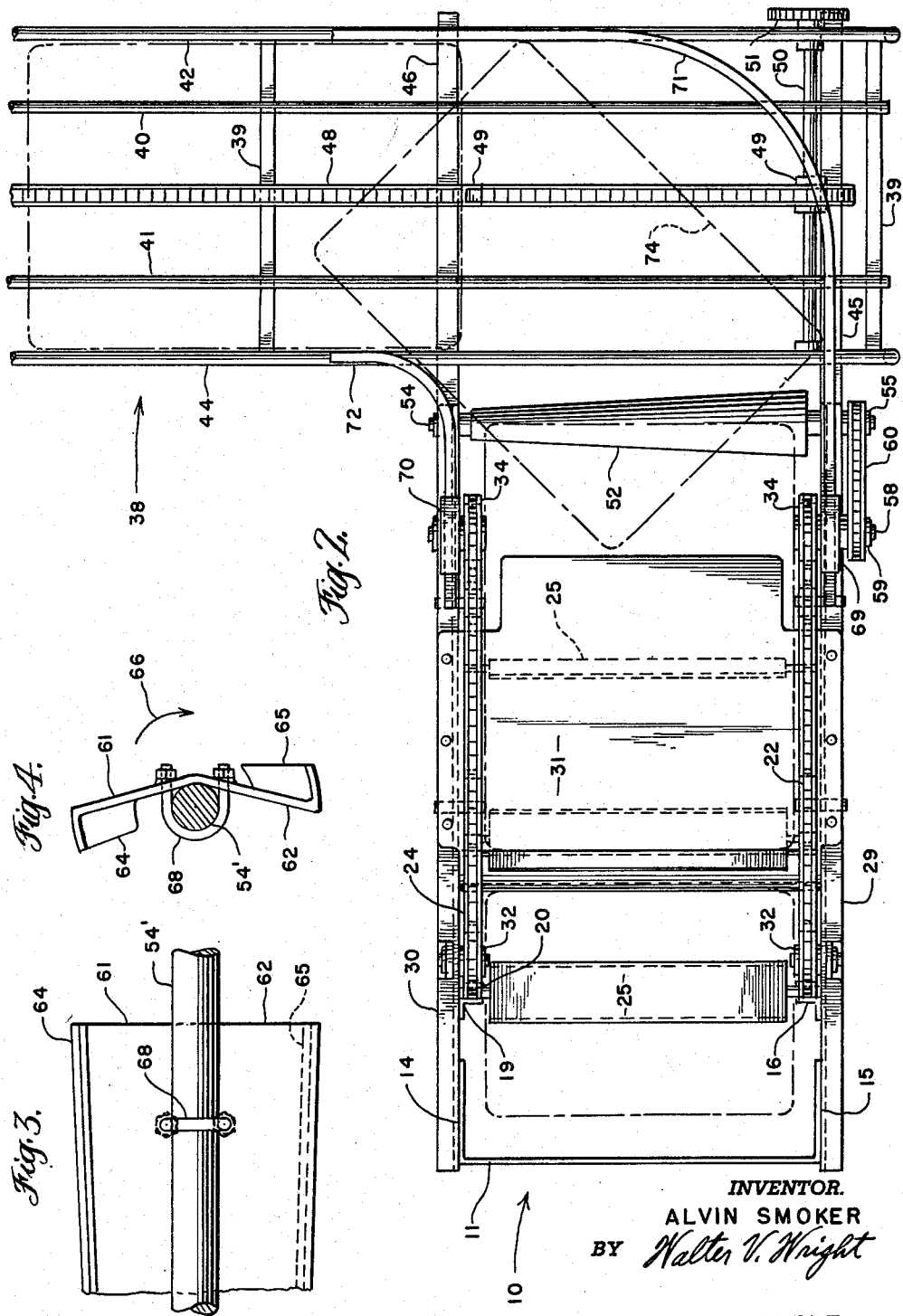

3,182,783
CONVEYOR
Alvin G. Smoker, Parkesburg, Pa., assignor to Sperry Rand Corporation, New Holland, Pa., a corporation of Delaware
Filed Jan. 3, 1963, Ser. No. 249,239
4 Claims. (Cl. 198—7)

This invention relates to bale conveying apparatus of the type commonly used to move bales of hay or the like from the ground into the storage mow of a barn.

In bale conveying systems of the above mentioned type, it is customary to deliver the bales from a first conveyor onto a second conveyor perpendicular to the first conveyor when it is necessary to move the bales around a right angle turn. It is at such transfer and turning points where the conveyor systems most frequently become jammed. It is also at such right angle transfer points that bales are most frequently damaged, or torn apart by the conveyor apparatus. This is due largely to the fact that at the point of transfer of the bale from the first conveyor to the second, it is common for the bale to be engaged simultaneously by two conveyors which are operating at right angles to each other and each of which has positive engagement with the bale such as by pusher plates or impaling lugs. Since the hay or other crop material from which the bales are made, is somewhat yieldable, these attempts to simultaneously drive the bale in two different directions sometimes result in the bale becoming wedged at an angle between the directions of operation of the two conveyors. The impaling lugs or pusher plates of the two separate conveyors then either tear through the bale leaving the conveyor system jammed, or they force the bale to bend until it breaks apart. Since these conveyor systems are frequently operated high in the air just under the roof of a barn, it is both difficult and dangerous for the farmer to clear the conveyor system for operation again.

Yet, important as this problem ils, it cannot be solved without regard to manufacturing cost. The field of bale conveyor manufacturing is highly competitive. Any structural solution involving high manufacturing cost is impractical and therefore unsatisfactory.

It is an object of this invention to provide bale conveyor apparatus for conveying bales of hay or the like around a ninety degree bend.

It is another object of this invention to provide a mechanically simple, low cost, rugged bale conveyor apparatus for conveying bales of hay or the like around a ninety degree bend.

It is another object of this invention to provide conveyor apparatus for conveying bales of hay or the like around a ninety degree bend, said apparatus being virtually jam proof in operation and substantially less likely to injure bales than other known conveyors.

It is another object of this invention to provide conveying apparatus for conveying bales of hay or the like around a ninety degree bend, which apparatus may readily be added to existing conveyor systems.

It is another object of this invention to provide a single apparatus which may be readily varied to selectively convey bales of hay or the like around a ninety degree bend to the right or to the left.

These and other objects and advantages of this invention will be apparent upon reference to the following description and claims taken in conjunction with the accompanying drawings wherein:

FIG. 1 is a side elevational view of the upper portion of a vertical bale elevator having a horizontal bale discharging portion and showing the apparatus of the present invention employed therewith to turn and deliver bales onto a second horizontal conveyor operating perpendicular thereto;

FIG. 2 is a plan view of the structure shown in FIG. 1;

FIG. 3 is a fragmentary elevational view of modified form of the tapered roller shown in FIGS. 1 and 2; and FIG. 4 is an end view of the structure shown in FIG. 3.

Referring to the drawings in detail, the numeral 10 indicates generally, a vertical bale elevator. The elevator 10 has front and rear side walls 11 and 12, respectively. The front wall 11 is in the form of a channel member, as best seen in FIG. 2, with flange, or side, portions 14 and 15 which, along with vertical angle members 16, 18, 19 and 20, define a rectangular hollow vertical elevator shaft. These members are all held in spaced relation to each other by horizontal bands, as seen at 21 in FIG. 1, at vertically spaced intervals along the height of the elevator. The vertical angle members 16 and 18 also form a guide track on one side of the elevator shaft for an endless conveyor chain 22. On the opposite side of the elevator shaft, the angle members 19 and 20 form a similar guide track for an identical endless chain 24. A plurality of pusher plates 25 are spaced along the chains 22 and 24 and have their ends carried by the chains. The plates 25 extend transversely across the elevator shaft as shown in FIG. 2 and serve to carry bales of hay or the like up the elevator shaft when the endless chains 22 and 24 are driven by conventional means, not shown. Two more sets of vertical angle members are provided behind the rear wall 12 of the elevator shaft to guide the return runs of the endless chains 22 and 24. One such set of angle members is visible in FIG. 1 at 26 and 28. These angle members are also rigidly held in position by the bands 21 spaced along the height of the elevator shaft.

At the top of the elevator 10 is mounted a first horizontal conveyor having side frame members 29 and 30. A bale supporting platform 31 is carried by the frame members 29 and 30 and extends therebetween. As may be seen in FIG. 1, the platform 31 may be a horizontal continuation of the rear wall 12 of the elevator. Three sets of sprockets identified by the numbers 32, 34 and 35 serve to guide the elevator conveyor chains horizontally along the upper side of platform 31, around the end of the platform and back down the elevator shaft between angle guides 26 and 28. An upstanding guide member 36 (FIG. 1), which may be an extension of the elevator front wall 11, serves to tip the bales onto the left (FIG. 1), or receiving, end of the bale supporting platform 31 as they emerge from the open top end of the elevator shaft. The pusher plates 25 then push the bales across the platform 31 to the right (FIG. 1), or discharge, end of the platform.

As best seen in FIG. 2, the sprockets 34 are spaced beyond the discharge end of platform 31 by an amount sufficient to allow the pusher plates 25 to move down past the platform 31 to begin their return run.

A second horizontal conveyor unit is indicated, generally, by the reference numeral 38. This unit comprises frame members 39 carrying bale supporting rails 40 and 41 and slide guide rails 42 and 44. The second conveyor unit is mounted perpendicular to the above described first horizontal conveyor unit. It may be supported, as shown, on arms 45 and 46 carried by the first conveyor frame members 29 and 30, or it may be supported from other suitable structure such as hangers, not shown, suspended from the barn rafters. The second horizontal conveyor unit 38 extends past the end of the first horizontal conveyor unit and is perpendicular thereto. The size guide rails 42 and 44 are disposed in a horizontal plane below the horizontal plane of the first conveyor bale supporting platform 31, and as seen in FIG. 1, they are above the horizontal plane of bale supporting rails 40 and 41 of the second conveyor unit. The second conveyor unit 38 includes an endless chain conveyor 48 having bale impaling lugs 49 at spaced intervals along its length. The chain 48 is carried by sprockets 49 (one shown) on transverse shafts 50 (one shown) as is well known in the art. The conveyor chain 48 is operable to feed blades along supporting rails 40 and 41 and between guide rails 42 and 44 perpendicular to the direction of feed of the first horizontal conveyor unit. The conveyor chain 48 is driven in a conventional manner (not shown) such as by an electric motor driving a sprocket 51 carried by the shaft 50.

Referring again to the first horizontal conveyor unit, the side frame members 29 and 30 project beyond the discharge end of the bale supporting platform 31. A tapered rotatable member 52 extends between members 29 and 30 at their extreme right ends as seen in FIGS. 1 and 2. While the members 29 and 30 are shown to be integral from end to end, it will be apparent that the portions of these members projecting to the right (FIG. 1) beyond sprockets 34 and carrying rotatable member 52 could be separate members bolted to the end of an existing conveyor unit. The rotatable member 52 is carried by a shaft 54 which is journalled in the frame members 29 and 30. The shaft 54 projects laterally through the frame member 29 and carries a sprocket 55 on the laterally projecting end thereof. The previously described sprockets 34 of the first conveyor, as may be seen in FIG. 1, are journalled in upstanding brackets carried by the frame members 29 and 30. One such bracket is visible in FIG. 1 and bears the reference numeral 56. The shaft 58 of the sprocket 34 visible in FIG. 1 projects laterally through the mounting bracket 56 and carries a sprocket 59 on the laterally projecting end thereof. An endless chain 60 is entrained around sprockets 59 and 55 thereby driving the rotatable member 52 from the first conveyor chain sprocket 34. It should be noted in FIG. 1 that the driven sprocket 55 is of smaller diameter than the drive sprocket 59, thus the rotatable member 52 is driven at a faster speed than that of the conveyor sprockets 34. The sprockets 55 and 59 could just as easily be provided at the opposite end of shaft 54 and on the opposite conveyor sprocket 34 if desired. The shaft, or axis, 54 of rotatable member 52 is perpendicular to the direction of feed of the first horizontal conveyor and parallel to the direction of feed of the second horizontal conveyor. The rotatable member 52 is tapered in the direction of feed of the second conveyor.

In FIGS. 1 and 2, the rotatable member is in the form of a frustroconical roller. In FIGS. 3 and 4, an alternate construction of this member is shown. The shaft 54' (FIGS. 3 and 4) is the same as shaft 54 in FIGS. 1 and 2. In place of the frustroconical roller a pair of longitudinally extending tapered fins 61 and 62 are provided on the shaft 54'. The fins are formed from a single sheet of metal and are preferably provided with flanges 64 and 65 at their radially outer ends. The flanges 64 and 65 are in trailing relation to the fins 61 and 62 relative to the direction of rotation of shaft 54'. The direction of rotation of shaft 54' is indicated by the arrow 66 in FIG. 4. The fins 61 and 62 are rigidly connected to shaft 54' by one or more U-bolts 68 as may be clearly seen in FIG. 4.

A horizontally disposed female socket member 69 is rigidly provided on top of the bracket 56 which journals one of the sprockets 34 of the first horizontal conveyor. A similar socket member 70 is provided on the other bracket (not visible) which journals the other sprocket 34. These socket members extend parallel to the direction of feed of the first horizontal conveyor. A generally horizontally disposed arcuate guide rail 71 has one end removably inserted in the socket 69 adjacent the large diameter end of the tapered rotatable member 52. The guide rail 71 extends across the second conveyor 38 and has its other end overlying the second conveyor remote side guide 42 and extending parallel thereto. A second horizontal arcuate guide rail 72 is carried by the female socket 70 adjacent the smaller diameter end of tapered rotatable member 52. The other end of rail 72 overlies and extends parallel to the adjacent side guide 44 of the second conveyor.

As shown in FIG. 2, the above described transfer and turning mechanism is adapted to feed bales from the first conveyor around a ninety degree bend to the left onto the second conveyor unit. If it were desired to feed around a ninety degree bend to the right, the guide rails 71 and 72 would be removed from their sockets, turned upside down and the rail 71 inserted in socket 70 and the rail 72 inserted in socket 69. The tapered rotatable member 52 would also be reversed so that the taper remained in the direction of feed of the second, or receiving, conveyor.

In FIGS. 1 and 2, bales of hay are shown in phantom lines in various positions on the conveyors. One such bale is numbered 74 in FIG. 2. The functions of the tapered rotatable member 52 are most clearly seen in this figure. The pusher plates 25 of the first horizontal conveyor push the bales onto tapered rotatable member 52 before they travel downwardly and around sprockets 34 to begin their return run. The member 52 carries the bale away from the pusher plates to prevent them from "digging" into the bale as they move around the sprocket 34. The taper of the member 52 urges the bale to turn in the direction of travel of the second conveyor chain 48. The guide rail 71 assists this turning action while the guide rail 72 provides a gentle curve around which the bale is turned. When the bale reaches the position shown at 74 in FIG. 2 and the impaling lugs 49 of the second conveyor have engaged it, the tapered roller 52 swings the trailing end of the bale onto conveyor 38 and completes the turning action. Since the roller 52 is traveling at a faster rate of speed than the conveyor chains and since it does not bit into the bale, it offers no resistance to oppose the pulling action of lugs 49 of the second conveyor. Thus, the problems which commonly tend to jam the conveyor systems at right angle turns are avoided. At no time is a bale of hay positively urged in two different directions simultaneously; nor are the lugs 79 of the second conveyor required to drag the dead weight of a bale around a ninety degree bend. As may be best in FIG. 1, the turning action is facilitated by the fact that the bale is being moved from an upper horizontal level to a lower horizontal level while it is being turned. Thus, the force of gravity acts to assist the transfer of the bale from the first conveyor unit to the second conveyor unit rather than to create drag which resists the turning operation as would be the case if the second conveyor unit were in the same horizontal plane as the first conveyor unit.

While the above described transfer mechanism is of general utility in the field of bale conveying systems, it has found particular merit when employed with the horizontal discharge platform of vertical bale elevators as disclosed hereabove. By use of the above apparatus a vertical bale elevator may be mounted against the end wall of a barn with the horizontal discharging platform running parallel to the barn wall and yet deliver bales onto a mow conveyor extending into the barn perpendicular to the barn wall. The space required outside the barn for the vertical elevator need only be equal to the width of the elevator unit. Thus, these elevator units may be employed where driveways or surrounding buildings would otherwise prohibit their use for lack of available space.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. Bale conveying apparatus comprising a first frame, bale supporting means on said first frame for supporting a bale in a generally horizontal plane, and supporting means having a bale receiving end and a bale discharge end, conveyor means on said first frame operable to feed bales along said supporting means from said receiving end to said discharge end, a second generally horizontal elongated frame, means to support said second frame perpendicular to and adjacent said first frame with said second frame extending past the discharge end of said first frame bale supporting means, bale supporting means on said second frame disposed in a generally horizontal plane spaced below the horizontal plane of said first frame bale supporting means, parallel side guides on said second frame above the horizontal plane of said second frame bale supporting means and below the horizontal plane of said first frame bale supporting means, said side guides extending perpendicular to the direction of feed of said first frame conveyor means, one of said side guides being disposed adjacent the discharge end of said first frame bale supporting means and the other of said side guides being more remote from the discharge end of said first frame bale supporting means, conveyor means on said second frame operable to feed bales along said second frame bale supporting means and between said side guides in a direction perpendicular to the direction of feed of said first frame conveyor means, and mechanism to transfer bales from the discharge end of said first frame bale supporting means to said second frame bale supporting means and to turn said bales in the direction of feed of said second frame conveyor means, said transfer mechanism comprising a rotatable member journalled on said first frame for rotation about its own axis, said rotatable member being disposed between the discharge end of said first frame bale supporting means and the adjacent side guide of said second frame with the axis of said rotatable member extending parallel to the direction of feed of said second frame conveyor means, said rotatable member having a large end and a smaller end and being tapered from said large end to said smaller end in the direction of feed of said second frame conveyor means, means driving said rotatable member from said first frame conveyor means, and a generally horizontal arcuate guide rail spaced above the plane of said first frame bale supporting means and having one end removably carried by said first frame adjacent the larger end of said tapered rotatable member, the other end of said arcuate guide rail overlying the remote side guide of said second frame and extending generally parallel thereto and parallel to the direction of feed of said second frame conveyor means.

2. Bale conveying apparatus comprising a first frame, bale supporting means on said first frame for supporting a bale in a generally horizontal plane, said supporting means having a bale receiving end and a bale discharge end, conveyor means on said first frame operable to feed bales along said supporting means from said receiving end to said discharge end, a second generally horizontal elongated frame, means supporting said second frame perpendicularly to and adjacent said first frame with said second frame extending past the discharge end of said first frame bale supporting means, bale supporting means on said second frame disposed in a generally horizontal plane spaced below the horizontal plane of said first frame bale supporting means, parallel side guides on said second frame extending perpendicular to the direction of feed of said first frame conveyor means and disposed between the respective horizontal planes of said first frame bale supporting means and said second frame bale supporting means, conveyor means on said second frame operable to feed bales along said second frame bale supporting means between said side guides, one of said side guides being disposed adjacent the discharge end of said first frame bale supporting means and the other of said side guides being more remote from the discharge end of said first frame bale supporting means, and mechanism to transfer bales from the discharge end of said first frame bale supporting means to said second frame bale supporting means to turn said bales in the direction of feed of said second frame conveyor means, said transfer mechanism comprising a rotatable member journalled on said first frame for rotation about its own axis, said rotatable member being disposed between the discharge end of said first frame bale supporting means and the adjacent side guide of said second frame with the axis of said rotatable member extending parallel to the direction of feed of said second frame conveyor means, said rotatable member being tapered from a large end to a small end in the direction of feed of said second frame conveyor means, means driving said rotatable member from said first frame conveyor means, a first generally horizontal arcuate guide rail spaced above the plane of said first frame bale supporting means and having one end carried by said first frame adjacent the larger end of said tapered rotatable member, the other end of said first arcuate guide rail overlying the remote side guide of said second frame and extending generally parallel thereto, and a second generally horizontal arcuate guide rail spaced above the plane of said first frame bale supporting means and having one end carried by said first frame adjacent the smaller end of said tapered rotatable member, and the other end of said second arcuate guide rail overlying the adjacent side guide of said second frame and extending generally parallel thereto.

3. Bale conveying apparatus as recited in claim 2 wherein said rotatable member comprises a frustroconical roller.

4. Bale conveying apparatus as recited in claim 2 wherein said rotatable member comprises a shaft having a plurality of longitudinally extending fins rigidly mounted thereon, said fins being tapered in the direction of feed of said second frame conveying means.

References Cited by the Examiner

UNITED STATES PATENTS

| | | | |
|---|---|---|---|
| 866,337 | 9/07 | Cowley | 198—78 |
| 1,216,585 | 2/17 | McCauley | 198—78 |
| 2,304,473 | 12/42 | Paxton | 198—79 |
| 2,353,638 | 7/44 | Beaulieu | 198—78 |
| 2,441,469 | 5/48 | Cameron | 198—79 |

SAMUEL F. COLEMAN, *Primary Examiner.*

ERNEST A. FALLER, JR., *Examiner.*